United States Patent
Watanabe et al.

(10) Patent No.: US 11,307,411 B2
(45) Date of Patent: Apr. 19, 2022

(54) SUPPORT DEVICE AND SYSTEM FOR ARTICLE PICKING OR SORTING WORK

(71) Applicants: TOYO KANETSU SOLUTIONS K.K., Tokyo (JP); M. SOFT CO., LTD., Tokyo (JP)

(72) Inventors: Kazuhito Watanabe, Tokyo (JP); Tadao Ito, Saitama (JP); Juji Yokoya, Chiba (JP); Norio Yagishita, Tokyo (JP); Norihiro Wada, Tokyo (JP); Yuka Tsushima, Tokyo (JP); Michio Yokoyama, Tokyo (JP); Hideaki Yonaga, Tokyo (JP); Yasuhide Matsumoto, Tokyo (JP); Rokuro Iwase, Tokyo (JP)

(73) Assignees: TOYO KANETSU SOLUTIONS K.K., Tokyo (JP); M. SOFT CO., LTD., Tokyo (JP)

( * ) Notice: Subject to any disclaimer, the term of this patent is extended or adjusted under 35 U.S.C. 154(b) by 0 days.

(21) Appl. No.: 14/411,664

(22) PCT Filed: May 31, 2013

(86) PCT No.: PCT/JP2013/065205
§ 371 (c)(1),
(2) Date: Dec. 29, 2014

(87) PCT Pub. No.: WO2014/002686
PCT Pub. Date: Jan. 3, 2014

(65) Prior Publication Data
US 2015/0192774 A1  Jul. 9, 2015

(30) Foreign Application Priority Data
Jun. 29, 2012 (JP) ................... 2012-147480

(51) Int. Cl.
*G02B 27/01* (2006.01)
*B65G 1/137* (2006.01)
(Continued)

(52) U.S. Cl.
CPC ......... *G02B 27/017* (2013.01); *B65G 1/1375* (2013.01); *G06Q 10/087* (2013.01);
(Continued)

(58) Field of Classification Search
CPC combination set(s) only.
See application file for complete search history.

(56) References Cited

U.S. PATENT DOCUMENTS 7,712,654 B2  5/2010  Yamaguchi
2003/0233165 A1  12/2003  Hein et al.
(Continued)

FOREIGN PATENT DOCUMENTS

DE  10215885 A1  10/2003
EP  2161219 A1  3/2010
(Continued)

OTHER PUBLICATIONS

International Search Report for PCT/JP2013/065205 dated Aug. 20, 2013.
(Continued)

*Primary Examiner* — Van Chow
(74) *Attorney, Agent, or Firm* — Kenealy Vaidya LLP

(57) ABSTRACT

Some embodiments are directed to a device that supports work of picking or sorting an article from a warehouse and the like, which allows the picking work to be carried out accurately and quickly. The device includes: a camera that photographs an automatically-readable identifier that is attached to a storage location of an article; an information processing unit that detects the identifier from an image photographed by the camera and processes the image of the (Continued)

identifier; and a display that displays information such as image information and text information. The information processing unit processes, based on the detected identifier and picking work order information, image on a specific identifier, and the processed image is displayed on the display at a location related to the identifier.

44 Claims, 12 Drawing Sheets

(51) Int. Cl.
    *G06Q 10/08*     (2012.01)
    *G06Q 50/28*     (2012.01)
(52) U.S. Cl.
    CPC ......... *G06Q 50/28* (2013.01); *B65G 2209/04* (2013.01); *B65G 2209/06* (2013.01); *G02B 2027/014* (2013.01); *G02B 2027/0138* (2013.01); *G02B 2027/0178* (2013.01)

(56) References Cited

U.S. PATENT DOCUMENTS

| | | |
|---|---|---|
| 2004/0138781 A1 | 7/2004 | Sacks et al. |
| 2007/0142961 A1 | 6/2007 | Bhasin et al. |
| 2010/0121480 A1 | 5/2010 | Stelzer et al. |
| 2010/0199232 A1 | 8/2010 | Mistry et al. |
| 2011/0158478 A1 | 6/2011 | Yamada et al. |
| 2013/0010103 A1 | 1/2013 | Ihara et al. |

FOREIGN PATENT DOCUMENTS

| | | | |
|---|---|---|---|
| JP | 57-137203 | A | 8/1982 |
| JP | 4-354704 | A | 12/1992 |
| JP | 10-147411 | A | 6/1998 |
| JP | 11-66350 | A | 3/1999 |
| JP | 2004-099278 | A | 4/2004 |
| JP | 2006-112933 | A | 4/2006 |
| JP | 2006-160388 | A | 6/2006 |
| JP | 2007-169069 | A | 7/2007 |
| JP | 2007-272302 | A | 10/2007 |
| JP | 2007-320715 | A | 12/2007 |
| JP | 2008-162770 | A | 7/2008 |
| JP | 2010-205031 | A | 9/2010 |
| JP | 2011-227875 | A | 11/2011 |
| WO | 2006/067829 | A1 | 6/2006 |
| WO | 2006067829 | A1 | 6/2006 |

OTHER PUBLICATIONS

English Translation of Office Action issued by the Japan Patent Office on Feb. 26, 2013 for Japan Patent Application No. 2012-147480.

English Translation of Office Action issued by the Japan Patent Office on Jun. 6, 2017 for Japan Patent Application No. 2014-522496.

Supplementary European Search Report issued by the European Patent Office on May 3, 2016 for European Patent Application No. 13809968.4.

Rupert Reif et al: "Pick-by-vision: augmented reality supported order picking", The Visual Computer; International Journal of Computer Graphics, Springer, Berlin, DE, vol. 25, No. 5-7, Mar. 3, 2009 (Mar. 3, 2009), pp. 461-467, XP019711725, ISSN: 1432-2315.

Reif R et al: "Evaluierung eines Augmented Reality-unterstlitzen Kommissioniersystems", Virtual Und Augmented Reality Zum Planen, Testen Und Betreiben Technischer Systeme: 11. Iff-Wissenschaftstage, Jun. 25-26, 2008, Magdeburg; Tagungsband, Iff, Magdeburg, Jun. 25, 2008 (Jun. 25, 2008), pp. 225-230, XP003026785, ISBN: 978-3-8167-7630-7.

Knapp AG: "Knapp AG-KiSoft Vision", Dec. 7, 2011 (Dec. 7, 2011), p. 1, XP054976499, Retrieved from the Internet (URL:https://www.youtube.comlwatch?v=BWY8uFltelM [retrieved on Apr. 25, 2016].

MTMmediathek—The Media Center for Industrial Engineers: "Pick-by-Vision Picking Tested in Practice", Jan. 15, 2010 (Jan. 15, 2010), p. 1, XP054976498, Retrieved from the Internet (URL:https://www.youtube.com/watch?v=fiiFGEvxFxY) [retrieved on Apr. 25, 2016].

Rupert Reif et al: "Augmented & Virtual Reality applications in the field of logistics", The Visual Computer International Journal of Computer Graphics, Springer, Berlin, DE, vol. 24, No. 11, Aug. 27, 2008 (Aug. 27, 2008), pp. 987-994, XP019656368, ISSN: 1432-2315, DOI: 10.1007/S00371-008-0271-7.

Reif R et al: "Einsatz von Virtual und Augmented Reality: Studie zur menschintegrierten Simulation und Prozessunterstatzung im logistischen Umfeld", Technische Universität München/Lehrstuhl Fürfördertechnik Materialfluss Logistik, Forlog -Bayerischer Forschungsverbund Supra-Adaptive Logistiksysteme, Jan. 1, 2007 (Jan. 1, 2007), pp. I-V,1 , XP003026786,Retrieved from the Internet (Url:http://www.fml.mw.tum.de/fml/images/Publikationen/ForLog_Studie_VR-AR_2007_Abgabe.pdf).

Gunther Heidemann, Ingo Bax, Holger Bekel "Multimodal Interaction in an Augmented Reality Scenario", ACM, 2 Penn Plaza, Suite 701-New York USA, Oct. 13, 2004 (Oct. 13, 2004), XP040010436.

SUPPORT DEVICE AND SYSTEM FOR ARTICLE PICKING OR SORTING WORK

This application is a national phase filing under 35 C.F.R. §371 of and claims priority to PCT Patent Application No. PCT/JP2013/065205, filed on May 31, 2013, which claims the priority benefit under 35 U.S.C. §119 of Japan Patent Application No. 2012-147480, filed on Jun. 29, 2012, which are hereby incorporated in their entireties by reference.

TECHNICAL FIELD

The invention relates to a device and a system for supporting an article picking work in management of physical distribution and warehousing, in particular to a work support device and a work support system that use an AR (augmented reality) solution.

BACKGROUND ART

In the field of physical distribution and warehousing, a picking work is carried out in which an article such as goods and components is taken out from a storage location, for example, correspondingly to an order from a customer. A work support system has been widely used, the system allowing the work to be carried out accurately and quickly. As such a work support system, Patent Literature 1 discloses the technological thought about a picking order system in that an indicator for indicating a picking order and a numerical quantity of articles to be picked is provided at a storage position for each of types of items in storage to visually indicate the picking order. Here, the indicator, such as a bay indicator for displaying some area, and an item indicator for displaying respective items in each bay may be required. Also, Patent Literature 2 discloses the technological thought about a picking order system that, for a picking work that takes out an article from a rack to house it in a container case that is being transported, includes an indication lamp that moves correspondingly to the transportation of the container case where the article is to be housed.

Here, in both of the picking work instructing methods, various indicators have to be provided at a location where an article is housed or a location where an article taken out is to be housed, and they have to be connected to control lighting, extinction and the like.

CITATION LIST

Patent Literature

Patent Literature 1: Japanese Patent Laid-Open No. 57-137203
Patent Literature 2: Japanese Patent Laid-Open No. 4-354704

SUMMARY OF INVENTION

Technical Problem

Therefore, the conventional, picking work supporting method that uses an indicator has the problem that facilities become large-scale and many, expensive indicators are required.

Therefore, to solve the above problem, an object of the invention is to provide an article picking work support device and an article picking work support system that allow an article picking work to be carried out accurately and quickly, in which an easily-prepared and cheap tag, such as a paper card on which an automatically-readable, optical feature like a bar code or a marker is printed, is attached on an article rack; the optical feature thereof is detected by a camera; and a picking order is displayed on a display correspondingly to the optical feature photographed by the camera.

Solution to Problem

To solve the problem, an article picking work support device according to a first invention includes:
A) an imaging unit that obtains image information having automatically-readable, optical feature information associated with an article or a storage location of an article;
B) an information processing unit that detects optical feature information from the image information obtained by the imaging unit and processes image information about the optical feature information; and
C) a display that displays information such as image information and text information, in which:
the information processing unit processes, based on the detected, optical feature information and predetermined picking work order information, image information about specific, optical feature information; and
the image information is displayed on the display at a location related to the specific, optical feature information.

According to the first invention, a picking work can be carried out efficiently in the situation that a worker is guided to a storage location of an article by some kind of method, or in the situation where a worker does not need to be guided to a storage location of an article, such as an article that is transported on a conveyor, an article that is sorted out to be housed in a case and further an article that is placed on a floor in a warehouse without use of a rack.

Also, an article picking work support device according to a second invention further includes:
D) a guidance unit that guides a worker to a storage location of an article, in which:
after the guidance unit guides a worker to a storage location of an article, the information processing unit processes, based on the detected, optical feature information and predetermined picking work order information, image information about specific, optical feature information, and
the image information is displayed on the display at a location related to the specific, optical feature information.

Note that the guidance unit may include: a method that recognizes automatically-readable, optical feature information similar to the automatically-readable, optical feature information associated with an article or a storage location of an article by using a camera of a worker; a guidance method that uses radio waves such as GPS, Wi-Fi, a wireless LAN and a mobile base station; a guidance method such as inertial navigation that uses a combination of an accelerometer and a gyro carried by a worker; or a method that recognizes, by using an external camera, optical feature information attached to a worker or a tool moving with a worker; or any combination of the methods; or any method that can guide a worker to a storage location of an article.

By doing this way, when the automatically-readable, optical feature information is used, information similar to the optical feature information used for an article or an article housing unit can be used, resulting in a simple configuration. On the one hand, when a different guidance method from this is used, a method suitable for conditions of a storage location can be selected to allow a worker to be quickly and accurately guided to a storage location.

Also, the article picking work support device according to the first or second invention may further include:

E) a memory unit that stores picking work order information associated with optical feature information, further in which:

the information processing unit processes, based on the detected, optical feature information and the picking work order information in the memory unit, image information about specific, optical feature information and the image information is displayed on the display at a location related to the specific, optical feature information.

Furthermore, the article picking work support device according to the first or second invention may further include:

F) an article quality inspection unit that inspects quality of an article to be picked, further in which:

if an article is not suitable for being picked, a predetermined, processing method is issued.

By doing this way, if an article to be picked is, for example, defaced or decomposed, the defaced or decomposed state of an article can be detected by the article quality inspection unit including sensors of smell, temperature, color, tactile sense, ultrasonic waves and the like, and picking reliability can be enhanced by reporting the state without picking such an article or by picking a substitute article.

Furthermore, in the article picking work support device according to the first or second invention:

the information processing unit processes image information about specific, optical feature information, the image information is displayed on the display at a location related to the specific, optical feature information, and also picking work support information prepared by the information processing unit is displayed on the display.

Also, in the article picking work support device according to the first or second invention:

the display is a head-mounted display capable of displaying both of actual, visual scenery information and prepared information, and image information about specific, optical feature information processed by the information processing unit is displayed on the display with the image information being associated with actual, visual scenery information at a location related to the specific, optical feature information.

In an article picking work support device according to yet another aspect of the first or second invention:

the display is a transportable display, and image information about the processed, optical feature information is displayed on the display with the image information being associated with camera-photographing image information photographed by the imaging unit at a location related to the specific, optical feature information.

In the article picking work support device according to the first or second invention, automatically-readable, optical feature information associated with an article or a storage location of an article is an identifier. Note that the identifier includes information devised to be easy to automatically read, the information being information based on a code such as a one-dimensional code including a bar code; a two-dimensional code including an AR marker, an ID marker, a NyID marker, a Data Matrix marker, a frame marker, a division marker and a QR Code®; and a multi-dimensional code including a color code whose amount of information is increased by adding color to these codes, and information based on characters that can be read by an OCR or are made easy to read.

Also, base material in which the identifier is to be provided may be base material capable of being printed on its surface, such as paper, cloth, plastic, film and the like. A cheap provision contributes to a decrease in cost.

Alternatively, base material in which the identifier is to be provided may be base material in which information is rewritable. For example, it may be electronic paper, an EL display, a lighting board and the like, and in such a situation, resource usage becomes small.

Note that a present position of a worker may be derived from image information on an identifier. That is, because the identifier has a predetermined shape and size, a distance between the worker and the identifier, and a direction relative to the identifier can be derived from information obtained by photographing. Therefore, if a position of the identifier is predetermined, the present position of the worker can be obtained and it is very effective for guiding a worker and ordering the picking subsequently.

Also, work order information and work support information may be displayed superimposed on the identifier. By doing this way, compared to the situation where the information is displayed at a location away from the identifier, required information can be grasped in one glance, helping to decrease occurrence of a picking miss.

Here, in the article picking work support device according to the first or second invention, for a picked article, information attached on an article to identify the article, such as a bar code, may be photographed by a camera to recognize whether the article agrees with the article specified by the picking order information or not. As the result, when the picking is correct, "OK" may be displayed on the display. It is expected that it largely contributes to a decrease in occurrence of a picking miss.

Also, in the article picking work support device according to the first or second invention, in a field of the view of the camera, information about work and displaying may be input by means of a gesture that uses hands and fingers of a worker. For example, it may be used to report the end of work, request an additional order during work, and scale the viewing area.

Alternatively, the article picking work support device according to the first or second invention further includes an audio response device having an audio input unit and an audio output unit, and by the audio response device, picking work support information may be obtained and/or information about the result of a picking work may be input.

Note that in the article picking work support device according to the first or second invention, the information processing unit may be separated and remotely provided. Information may be processed via a network as is in a so-called cloud computing. By doing so, an expensive, information processing unit can be eliminated, or many picking work support devices can receive a uniform service.

Also, in the article picking work support device according to the first or second invention, a work history of a worker may be collected. Collecting it helps to improve work efficiency of a worker.

Furthermore, in the article picking work support device according to the first or second invention, a work indicator may be displayed on the display. This can allow a worker to recognize the work progression, thus helping to improve work efficiency.

Also, in the article picking work support device according to the first or second invention, when articles to be picked are insufficient in a specified housing frontage, the information processing unit may correspondingly continue the picking according to a predetermined rule in a situation of insufficiency, select a substitute article from the same or a nearby housing frontage, or pick the article from a specified, housing frontage in another storage site to which the worker moves. In such a manner, if an article shortage occurs, the work can be accurately completed.

Also, the article picking work support device according to the first or second invention may include a management terminal that is connected directly or via a server or the like thereto and has at least a display and a work ordering unit that uses characters, an image, a voice and the like. Because information similar to the information displayed on the display of the picking support device can be displayed and an administrator can see it, work efficiency of a worker can be improved.

Furthermore, in the article picking work support device according to the first or second invention, based on the situation where an optical feature such as an identifier cannot be detected, a failure such as dropout and defacement of the identifier itself, and a failure such as shift and collapse of a structural object such as a rack and an aisle in which the identifier is provided may be detected. By doing so, the storage location of an article such as a warehouse and the identifier itself are appropriately maintained and work efficiency of a worker is improved.

Also, in the article picking work support device according to the first or second invention, instead of the article picking work support, an article housing work support may be carried out. That is, instead of the picking work order information, housing work order information is displayed. By doing so, by using a configuration and a technological thought similar to the picking work support device, an article housing work support device can be realized.

Also, to solve the problem, an article picking work support system according to a first invention includes:

A) automatically-readable, optical feature information associated with an article or a storage location of an article; and B) a picking work support device including: an imaging unit that obtains image information about an article or a storage location of an article; an information processing unit that detects optical feature information from the image information obtained by the imaging unit and processes image information about the optical feature information; and a display that displays information such as image information and text information, in which:

the information processing unit of the picking work support device processes, based on the detected, optical feature information and predetermined picking work order information, image information about specific, optical feature information, and the image information is displayed on the display at a location related to the specific, optical feature information.

Furthermore, an article picking work support system according to a second invention further includes:

a guidance unit that guides a worker to a storage location of an article, in which:

after the guidance unit of the picking work support device guides the worker to the storage location of an article, the information processing unit processes, based on the detected, optical feature information and predetermined picking work order information, image information on specific, optical feature information and the image information is displayed on the display at a location related to the specific, optical feature information.

Note that many features about the article picking work support device according to the first or second invention described above can be applied to the picking work support system.

Advantageous Effects of Invention

In the article picking work support device according to the invention, optical feature information associated with a storage location of an article to be picked, for example, an identifier is processed, for example, to redly color a frame portion of the identifier, based on picking order information and the processed image information is displayed on the display at a location associated with a location where the article is housed, and also picking work support information, such as an article name and a numerical quantity of articles, prepared by the information processing unit is displayed on the display so that a picking work can be definitely instructed to a worker, thus allowing an accurate, quick, picking work of an article to be supported.

Additionally, further providing a guidance unit allows a worker to arrive at a storage location of an article to be picked with no doubt and to quickly start a picking work.

Particularly, if a head-mounted display is used as the display, then there is an advantage that a picking work becomes easy because both hands are free, and additionally, if processed, optical feature information is displayed in an actual, visual scenery, then occurrence of mistaking a picking location is reduced.

On the one hand, if, as the display, a portable display such as a tablet, a smartphone, a PC and a portable game terminal (Nintendo 3DS®, PSP®, PS Vita® and the like) is used, then a system can be configured simply because general-purpose equipment can be used.

Also, if an identifier, which is easy to automatically read, for example, an AR marker is used as optical feature information, then a system can be developed in a low-cost way because it is easy to sense information and to recognize position and direction information of the marker, and additionally the marker itself may be manufactured in a low-cost way, and the system can be operated cheaply.

Furthermore, if an audio response device is combined, then compared to the situation that there is only an image, it may be expected that work is more accurately carried out and the result of the work is input with certainty.

DESCRIPTION OF EMBODIMENTS

First Embodiment

Now, a picking work support device according to a first embodiment of the invention will be described below with reference to the drawings. Note that items will be schematically described below to the extent of a necessary description to achieve an object of the invention and mainly described to the extent of a necessary description to illustrate the part corresponding to the invention, and the part about which description will be omitted is of a known art.

Figure 1:
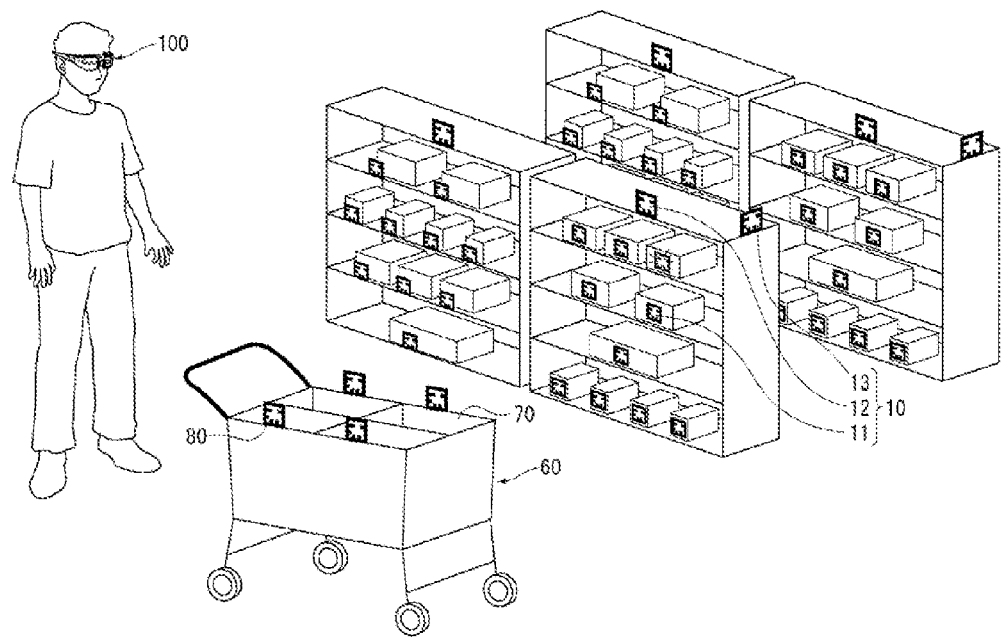
FIG. 1 is a schematic illustration of a picking work support system including a picking work support device according to a first embodiment of the invention.
Figure 2:
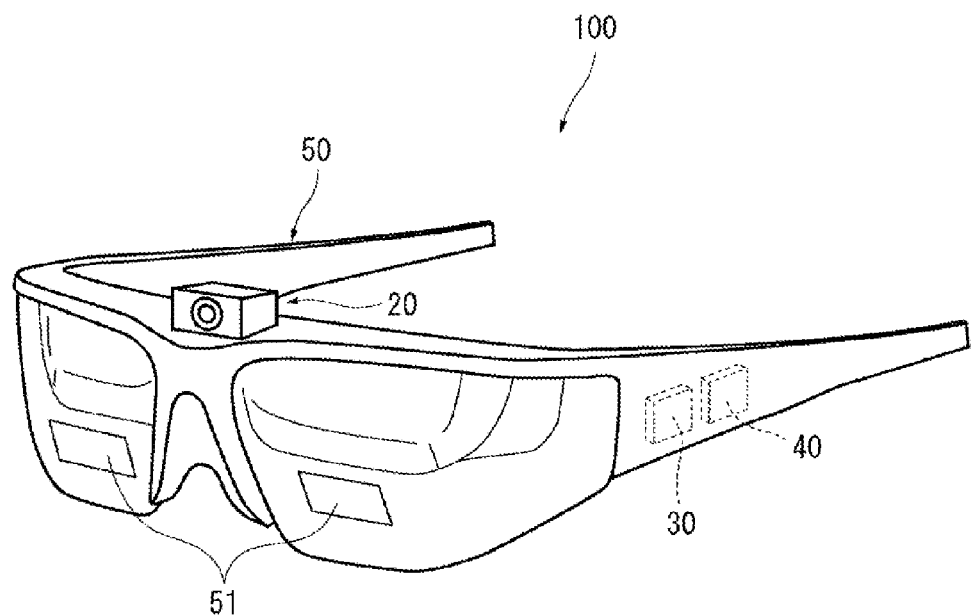
FIG. 2 is a general configuration view of the picking work support device according to the first embodiment of the invention.

FIG. 1 is a schematic illustration of a picking work support system including a picking work support device 100 according to a first embodiment of the invention, and FIG. 2 is a general configuration view of the picking work support device 100 according to the first embodiment of the invention.

The picking work support device 100 includes, to allow a worker to pick an article, a housing frontage that houses an article, a rack having a plurality of the housing frontages and an identifier 10 including a housing frontage identifier 11, a rack identifier 12 and an aisle identifier 13 provided in each aisle formed of a line having a plurality of the racks. Here, in each of the housing frontages, a specific article is housed in a case such as a container and a cardboard box, and to the case, the identifier is attached. Note that the identifier may be attached, instead of to the case, to a frame of the rack in which the case is placed, and furthermore without use of the identifier, a shape, a design on the surface and color of the case or the article itself may be identified.

Here, the housing frontage, the rack and the aisle in an article housing compartment are hierarchically named in the order from a narrow location to a large space where an article is housed, but particularly not limited to this, and another way of calling may be applied. Also, the rack identifier 12 and the aisle identifier 13 may be omitted when it is not necessary to guide a worker to in front of the rack or a guidance method without use of the identifier is adopted.

Figure 10:
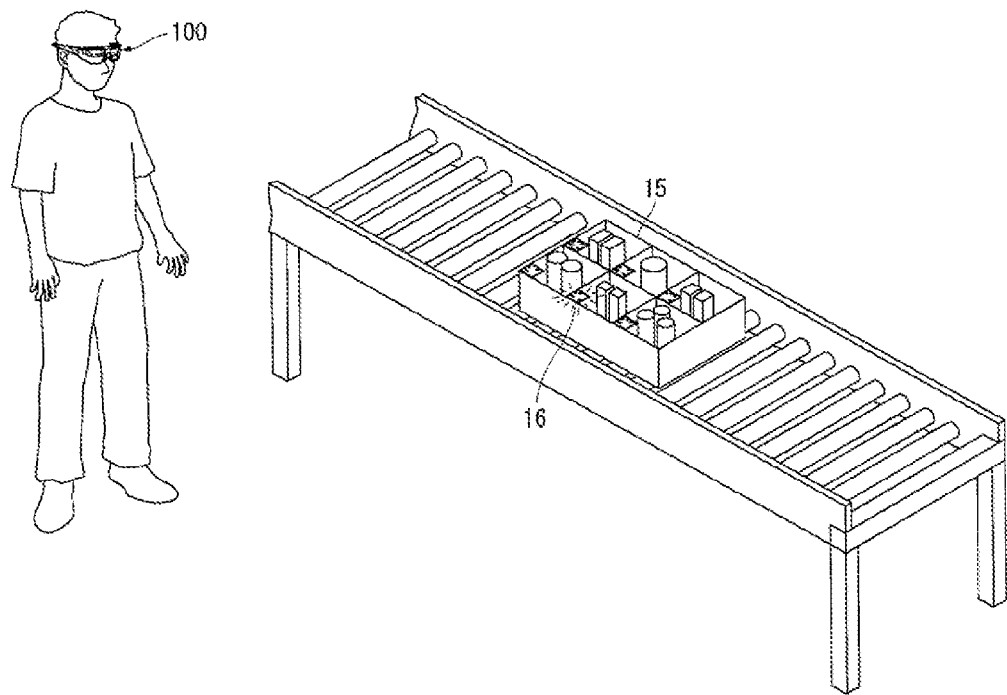
FIG. 10 is a schematic illustration of the picking work support system including the picking work support device according to the first embodiment of the invention.

As shown in FIG. 10, there may be the situation where an article is not housed by a structural object such as a rack, but housed in a case 15 with a partition, and the case 15 is showed in front of a picking worker.

Figure 12:
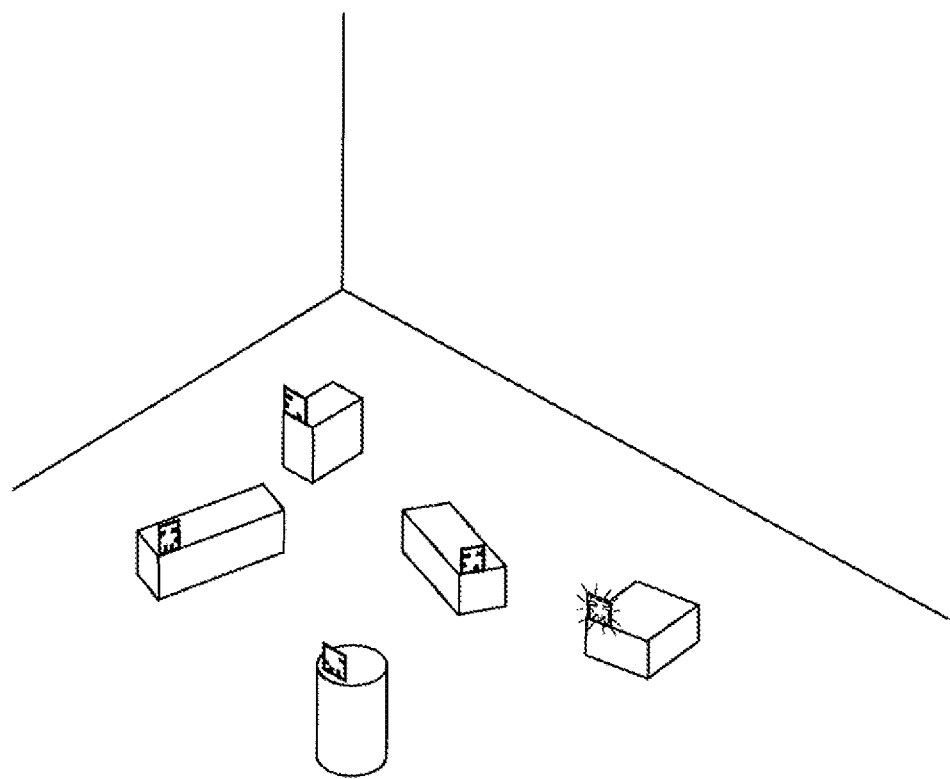
FIG. 12 is another, general configuration view of the picking work support system including the picking work support device according to the first embodiment of the invention.
Figure 13:
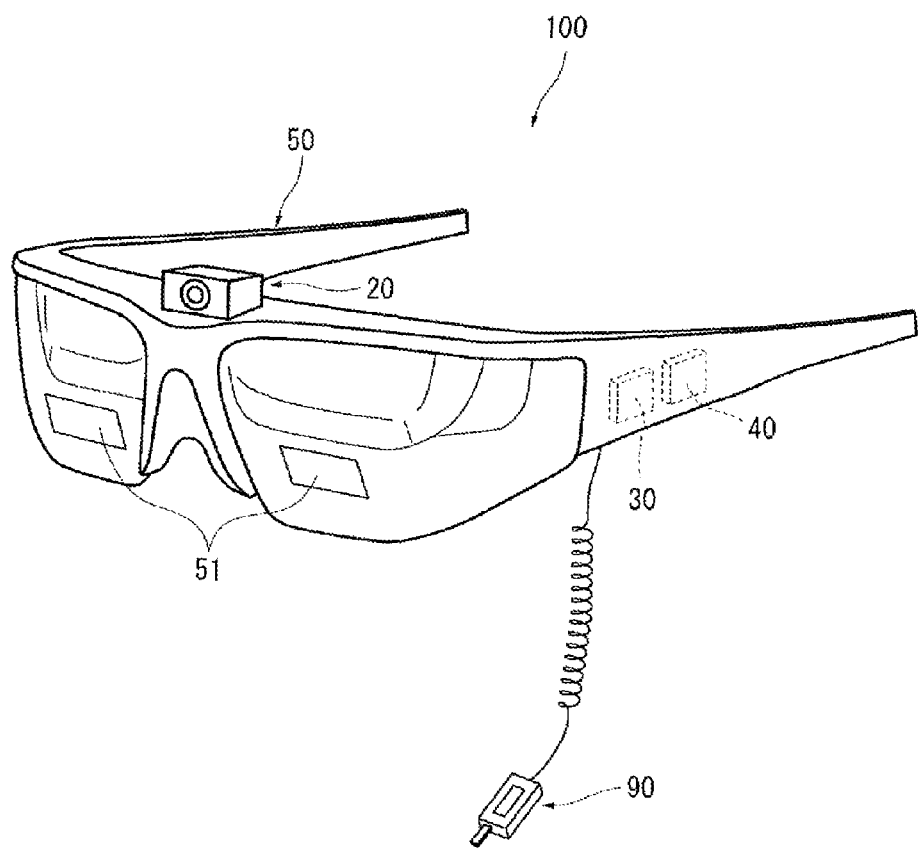
FIG. 13 is another, general configuration view of the picking work support device according to the first embodiment of the invention.

Furthermore, as shown in FIG. 12, depending on a shape of an article and a work method, an article may be directly placed on a floor, or mounted on a platform like a pallet in or out of doors.

Also in other situations, an article or a case for housing an article may be mounted on a moving conveyor and shown in front of a worker in order, and the worker may pick an instructed article from among articles.

Also, as the identifier, preferably, an AR marker is used, the AR marker capable of being automatically read, of which the identifier part itself can be cheaply manufactured and which has a large amount of information, but not limited to this, and other identifiers may be adopted. The identifier may be provided and formed, for example, in a method that an identifier is printed on paper, base material.

The picking work support device 100 includes an imaging unit such as a camera 20, a memory unit 30, an information processing unit 40 and a head-mounted display 50.

The camera 20 has a function for photographing a storage location of an article. The camera 20 is preferably a digital camera because of image processing, but not limited to this. Additionally, the camera is preferably capable of video filming, but may be capable of still image shooting.

The memory unit 30 has a function for storing picking work order information associated with information on the identifier 10. The memory unit 30 stores a series of information, for example, various types of information about a work order number, a worker number who carries out the relevant work, and a housing frontage number, a housed article name and a numerical quantity of picked articles about the article to be picked by the relevant work order, an identifier identification number corresponding to the housing frontage number and the like.

The information processing unit 40 detects information on the identifier 10 from image information photographed by the camera 20, and processes, based on the detected information and picking work order information in the memory unit 30, the information on the identifier to support a picking work, and also prepares information to support the picking work.

The head-mounted display (HMD) 50 has a function for scaling and displaying information such as image information and text information at a faraway, virtually looking and listening distance by using an optical system. Here, the HMD 50 has a see-through mechanism 51 such as a half-mirror built-in to allow a worker to see an actual, external world, and also is capable of displaying the image information and the text information from the information processing unit 40 and the like.

Here, the camera 20 is formed together with the HMD 50 and electrically connected to it. Also, the memory unit 30 and the information processing unit 40 are incorporated in the HMD 50 or formed together with it, and are electrically interconnected to each other including the camera 20. When a worker actually wears the HMD 50, the worker may, for example, wear it in the head to use. Furthermore, to power the camera 20, the memory unit 30, the information processing unit 40 and the HMD 50, a power supply such as a battery not shown is incorporated or connected to them, and additionally, if necessary, to exchange information, a communicating device not shown is also connected to them. The battery and the communicating device are preferably fixed on the body or a working clothes of a worker, or capable of being fixed or attached on it.

An article quality inspection unit 90 is connected to the picking work support device 100. In particular, the article quality inspection unit is a detecting instrument capable of sensing information that an article to be picked sends such as smell, temperature, color, ultrasonic waves and the like, and an analyzing means for analyzing the information. The part of the detecting instrument may be incorporated in the picking work support device 100, or may be separated from it with being connected wired or wireless to it so that the detecting instrument can approach an article to be picked.

Also, as the need arises, the picking work support device 100 may additionally include an audio response device that has an audio input unit such as a microphone and an audio output unit such as earphones.

Note that the memory unit 30 may be eliminated if picking work order information is received for each picking work via the communicating device from a system such as a remote warehouse management system not shown.

Next, working and operation of the invention configured in a manner described above will be described in detail.

A worker who engages in an article picking work, before start of the picking work, receives a set of the HMD 50 incorporating the camera 20 therein, the memory unit 30 and the information processing unit 40 in a preparation area and wears them on the body or a working clothes. Here, for personal authentication of a worker, a worker identity card (not shown) is photographed by the camera 20 to detect a worker identifier registered in the worker identity card and to recognize a worker number. Next, from the worker number, corresponding, picking work order information stored in the memory unit 30 can be derived. Note that the method of personal authentication is not limited to this, and it may be of a non-contact IC card, face authentication, voice recognition and the like. Furthermore, without particularly executing personal authentication, work order information may be given in the order of arriving at the preparation area.

Figure 3:
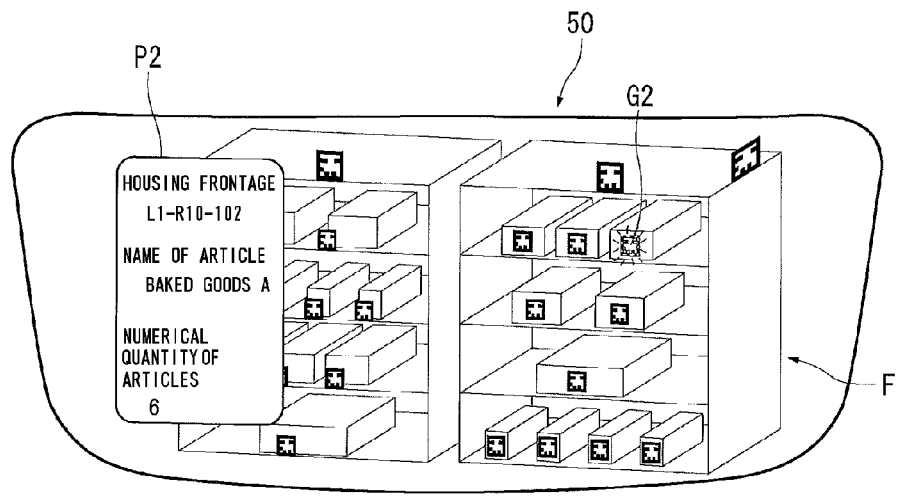
FIG. 3 is an illustration showing how the picking work support device according to the first embodiment of the invention is seen.
Figure 4:
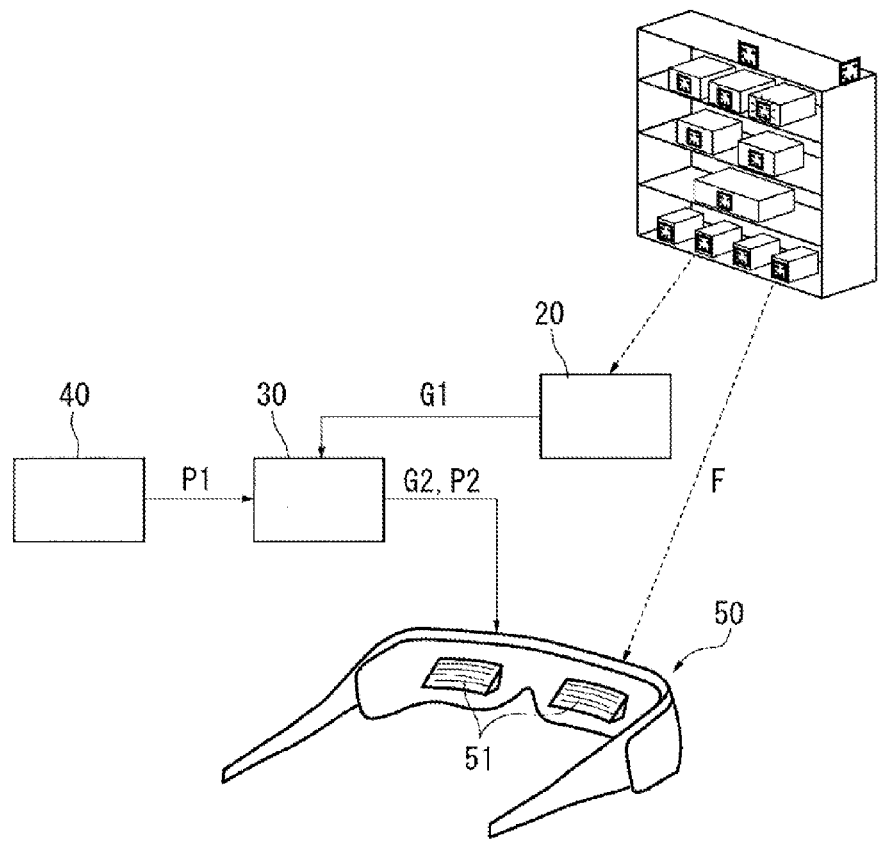
FIG. 4 is an illustration showing a flow of image information in the picking work support device according to the first embodiment of the invention.

FIG. 3 is an illustration showing how the picking work support device 100 according to the first embodiment of the invention is seen, and FIG. 4 is an illustration showing a flow of image information in the picking work support device 100 according to the first embodiment of the invention.

Subsequently, the worker enters a location where an article is housed and directs the camera 20 toward a storage location of an article. Then, an image F is photographed to obtain information G1. The image information G1 includes some, aisle identifiers 13. Here, the information processing unit 40 identifies an aisle where an article to be picked first is housed, from picking order information P1 stored in the memory unit 30 and information on the aisle identifiers 13 included in the image information G1, and processes image information G2 on identified aisle identifier 13, for example, to redly color a frame portion of the aisle identifier 13.

On the viewing surface of the display of the HMD 50, based on the picking work order information P1 stored in a memory unit 40, for example, picking work support information P2, for example, a housing frontage number, an article name and a numerical quantity of articles to be picked, is displayed. The worker who wears the HMD 50 can see a scenery F including an actual rack that houses an article via the see-through mechanism 51 and also see the picking work support information P2. Here, for the identified aisle identifier, the image information G2 whose frame portion is redly colored is superimposed with each other and displayed at a position of the aisle identifier 13 corresponding to the actual rack that houses an article.

The displaying method is executed as following. First, the HMD 50, after the worker wears it in the head, displays both of a visual scenery that is visible after transmitting through the see-through mechanism 51 and an image photographed by the camera via the see-through mechanism 51, and the HMD is adjusted to display the visual scenery and the photographed image so that the worker can see them in agreement with each other and in a superimposed state.

At the time, as needed, a head tracking device may be used. For example, by carrying out six-degree-of-freedom measurements about an X-axis, a Y-axis, a Z-axis, pitch, roll and yaw, positions of the head and the eyes of a worker can be accurately grasped to facilitate to maintain a superimposed, displaying state when the worker is moving.

Subsequently, the image photographed by the camera is not displayed. The worker starts work and uses the picking work order information, and the information processing unit 40 processes information on the identifier image, then only the processed identifier image is displayed on the viewing surface of the display via the see-through mechanism 51. By doing so, the frame portion of the aisle identifier 13 portion in the visual scenery is redly displayed so that the aisle where the picking work is to be conducted is shown to the worker.

Note that the picking work support information P2 may include, in addition to these, a lot number, a pick unit number, a caution against like goods, an order for distributive processing, a method for recognizing the top and the bottom of an article, information on a still image of an article or the like, or any information that supports the picking. Additionally, this information may be, in addition to the still image, a video that illustrates contents of work, CG, or any combination thereof (so-called multimedia).

Note that the HMD 50 may be a mechanism that displays information only on the side of one eye, or on either side of the eyes.

The worker continues to approach the aisle identified by the aisle identifier 13 and looks around a group of racks along the aisle. Then, in addition to displaying of the aisle identifier 13 in red, a specific rack identifier 12, where the article to be picked is housed, is recognized among the racks belonging to the aisle in a similar way that the aisle is identified, and additionally a frame portion of the specific identifier is also redly displayed, thus showing the rack, where the picking work is to be conducted, to the worker.

For displaying, both of the specific aisle identifier 13 and the specific rack identifier 12 are redly displayed, but the displaying may be switched. For example, when the worker approaches the identified aisle, the worker covers the aisle identifier with the hand or the like. An image in which such an action of the worker is photographed by the camera is analyzed to determine that the worker arrives at the identified aisle, thus displaying switched. In such a situation, to prevent a false operation, conditions that covering be performed by a predetermined number of times (for example, two times) or for a predetermined duration (for example, 5 sec) may be imposed. Note that the method for switching displaying is not limited to this, and various methods may be thought, for example, a method that switching is carried out when detecting that the identified aisle identifier image becomes not smaller than a predetermined size, a method that displaying the aisle identifier is switched to displaying the rack identifier when the specific rack identifier image becomes visible, or a method that switching is conducted by an indication of a worker (when the indication from the worker is received).

Furthermore, similarly, the worker approaches the rack identified based on the rack identifier 12 and looks around a group of housing frontages of the rack, and then, similarly to the situation that the rack is identified, as shown in FIG. 3, a specific housing frontage identifier 11 where the article to be picked is housed is recognized among the housing frontages belonging to the rack, and additionally a frame portion of the specific identifier is also redly displayed, thus showing the housing frontage where the picking work is to be conducted to the worker.

By doing so, the worker arrives at the target housing frontage, and there, takes out specified articles by a specified numerical quantity of articles based on the picking work order information and houses the articles in a transportation case 70 in a trolley 60. Note that if different articles are housed in the same housing frontage, then an article to be taken out may be indicated by posting a guide graphic near the housing frontage identifier 11 such as an arrow, an additional identifier may be attached on an article, or a shape and the like of an article may be detected as an optical feature.

Figure 14:
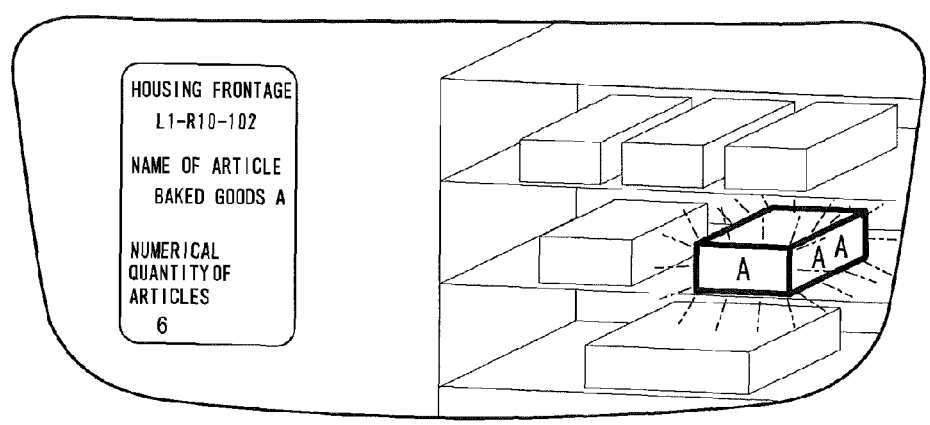
FIG. 14 is an illustration showing another state in that the picking work support device according to the first embodiment of the invention is seen.

Note that at this time, as shown in FIG. 14, an article itself or an outline of a case that houses an article may be, for example, processed and redly displayed. Furthermore, information about an article may be displayed inside the outline. This helps to prevent a picking miss if there is an article of a similar outline.

Here, for the picked article, information attached on the article to identify the article such as a bar code may be photographed by the camera to recognize whether the article satisfies the picking order information or not. As the result, when the picking is correct, "OK" may be displayed on the display. Note that, instead of a code such as the bar code, a shape of an article and a design on the surface of an article may be photographed by the camera to recognize it. When the picking is correct, a confirmation sound such as a bleep may be made. Alternatively, in contrast, only when the picking is not correct, any response may be made.

When articles to be picked are insufficient in a specified housing frontage, the information processing unit 40 correspondingly continues the picking according to a predetermined rule in a situation of insufficiency, selects a substitute article from the same or a nearby housing frontage, or carries out the picking from a specified housing frontage in another storage site to which the worker moves.

Also, if there is a plurality of transportation cases 70, and, for example, picked articles are sorted and housed for each customer, then, similarly to the situation on picking, a transportation case identifier 80 may be attached on the transportation case 70, and information on a specific transportation case identifier 80 where an article is to be housed may be processed and displayed based on the picking work order information, thus supporting the housing work.

Note that in the aforementioned, a method by which the information on the identifier image is processed is the method that the frame portion is redly colored, but not limited to this, and there may be methods that: the color may be any color other than the red color; the identifier image may be made bright; the identifier image may be blinked; an image having a different shape from the identifier may be displayed at a position of the identifier, and furthermore; the identifier image is not displayed exactly at the location of the identifier, but may be displayed at a location associated with the location of the identifier (for example, it is displayed with an arrow or a balloon from the location of the identifier being added, or displayed at a corresponding location in the image in which housing frontages in a rack unit reduced are intensively illustrated).

Additionally, in addition to or instead of those, in the image, the picking order information may be displayed in association with the location of the identifier (for example, it is displayed superimposed on the location of the identifier, or displayed with a balloon from the location of the identifier being added).

Also, the identifier portion is not processed, and the aisle, the rack and the housing frontage itself to be identified by the identifier may be detected by the camera, and image information about those portions may be processed to be displayed superimposed on a visual scenery. This helps to further prevent a miss because actual objects are emphasized and displayed.

Note that if the article quality inspection unit 90 is included, then its checking unit is directed toward the article to be picked or made to approach it, and information about quality of the article can be collected. In particular, it is information such as smell, temperature, color and ultrasonic waves, and those are analyzed by an information analyzing means in the article quality inspection unit 90 or the information processing unit 40 to determine whether the article is suitable for being picked or not according to a predetermined decision criterion.

Here, for example, for a smell sensor, a method has been realized that a density of ammonia or hydrogen sulfide is measured; for a temperature sensor, a method that uses a thermistor; for a color sensor, a method that uses an LED as a light source and a photodiode as a light receiving element; for an ultrasonic wave sensor, a method that is used for diagnostic imaging, and an appropriate method, in addition to these, may be utilized.

As the result, the worker, while following a predetermined rule or requesting a direction from an administrator in each case, correspondingly picks a substitute article, picks the article from another storage location, gives up the picking or brings back an inappropriate article.

After the instructed, picking work is completed, a next picking order is given. Here, the completion is determined automatically based on a time elapsed from the arrival at the picking location; a change in camera direction due to the fact that the worker moves away from the picking location; and a change in article storage state in the picked rack. And the completion is determined by a direction from the administrator who remotely observes a camera image if the camera image is transmitted via a communication line; and by a completion report from the worker via an input device or an audio response device. For the input device, the worker holds a specific identifier that indicates "completion" and photographs the identifier by the camera to allow "completion" to be input, but not limited to this, and the input device may be a common, touch panel. Note that the specific identifier may indicate not only "completion", but "redisplaying". This allows the displaying once completed to be redisplayed.

By doing so, the next picking work order is given and the worker continues the picking work according to it.

Once a series of the picking work is completed, the worker, after delivering the article already picked to a post-process with a predetermined method, returns to the preparation area and brings back the set of the HMD 50 having the camera 20 therein, the memory unit 30 and the information processing unit 40. At this time, personal authentication for work completion may be conducted by a method similar to that at the start.

Note that in the aforementioned, a worker is guided by the aisle identifier 13, the rack identifier 12 and the housing frontage identifier 11 to an article to be picked, but the worker may be otherwise guided to in front of a rack and the worker may be ordered only to pick an article from a housing frontage.

Here, the housing frontage, the rack and the aisle of an article housing compartment are hierarchically named from a narrow location to a wide area where an article is housed, but particularly not limited to these, and they may be otherwise called. Furthermore, the rack identifier 12 and the aisle identifier 13 may be also eliminated if it is not necessary to guide a worker to in front of a rack, or a guidance method that does not use an identifier is used.

For example, as shown in FIG. 10, there may be the situation where an article is housed in a case 15 having a partition and the case 15 is transported by a conveyor to be shown in front of a worker, and in such a situation, assuming that the worker stands at a predetermined position, it is not necessary to guide the worker.

Figure 11:
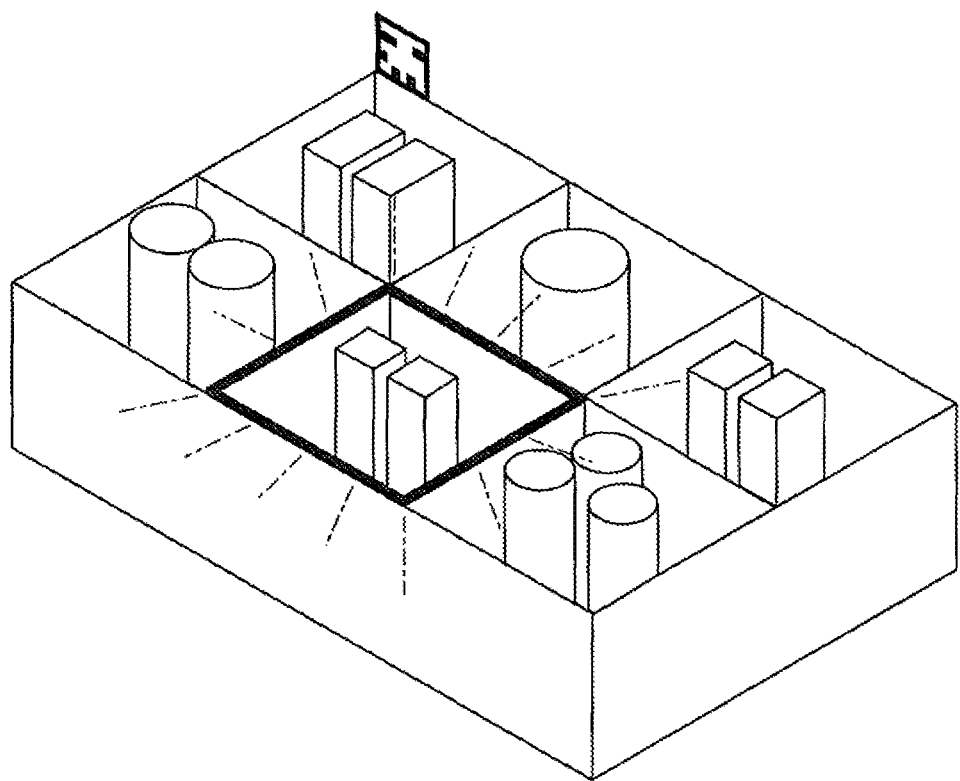
FIG. 11 is another, general configuration view of the picking work support system including the picking work support device according to the first embodiment of the invention.

Here, an identifier 16 is provided in each of divided locations in the case 15 and similarly to the above description, an identifier of the location where an article to be picked is housed may be processed and displayed. Also, as shown in FIG. 11, if the case 15 has only a single identifier 17 and in the identifier, information about a location where an article to be picked is housed is included, then identifying it allows the information to be processed, thus displaying the location where the article to be picked.

Also, as shown in FIG. 12, if an article is placed directly on a floor or mounted on a platform like a pallet in or out of doors and the area is open, then particularly a guidance method is not necessary and an identifier 18 attached on an article or a location where an article is placed may be identified to be processed and displayed.

Additionally, there may be the situation where an identifier is attached on an article itself that runs on a conveyor or a case that transports an article, instead of on an aisle, a rack and a housing frontage, a worker photographs the identifier with the camera and the article to be picked based on a work order is grasped from a change in frame color of the identifier, thereby the worker picks the article from the conveyor.

If it is necessary to guide a worker, then there may be, in addition to the method that uses an optical feature of an identifier and the like, also a guidance method that uses radio waves such as GPS, Wi-Fi, a wireless LAN and a mobile base station; a guidance method such as inertial navigation that uses a combination of an accelerometer and a gyro carried by a worker; or any combination of the methods; or any method that can guide a worker to a storage location of an article.

When an identifier, for example, a two-dimensional code such as an AR marker is used, if a position at which a marker is provided is known, then from a size and an inclination of the marker in an image photographed by the camera, a distance and a direction of a worker to the marker position can be calculated and a present position of the worker can be grasped accurately. This allows guidance accuracy to be improved. Note that a position calculation method that uses an AR marker is described in detail in "Augmented Reality System and Calibration Based On Marker Tracking" by Hiroichi Kato et al., Transactions of the Virtual Reality Society of Japan, Vol. 4, No. 4, 1999. Note that the identifier by which a position can be detected may include, in addition to the AR marker, a one-dimensional bar code, a two-dimensional code other than the AR marker and further a three-dimensional code.

When an identifier is not used, in particular, if a storage location of an article is wide so that a location is difficult to identify, then position information about a storage location of an article may be stored in advance and the picking work support device may have a function for receiving a GPS signal. By doing so, using this allows a present position of the picking work support device to be grasped, and furthermore, map information is combined, thus allowing a worker to be quickly guided to the storage location of an article and also to work to be easily started. Note that position information, in addition to information from GPS, may also include position information such as Wi-Fi and a mobile base station.

Additionally, a travel distance from a starting point can be calculated by using a combination of an accelerometer and a gyro carried by a worker. That is, a velocity is obtained by integrating an acceleration detected by the accelerometer and a distance is obtained by integrating the velocity. On the one hand, a direction is sensed by the gyro and a vector of the distance and the direction is synthesized at each subdivision point so that the travel distance from the starting point can be calculated. It is a so-called inertial navigation and if a position of a starting point is input, then a position and a velocity of a worker are always calculated and can be grasped during movement, therefore it is very effective in the environment where radio waves are not available. This information and information about a storage location of an article are used, thus allowing a worker to be guided to the storage location of an article.

Furthermore, there is also a method that an identifier such as a marker for identifying a worker is provided above the head of the worker. This identifier is photographed by a camera provided on a ceiling of a warehouse, and a distance between an installation position of the camera and a position of the identifier in a photographed image and a direction relative to the installation position are calculated so that a present position of the worker can be grasped, thus allowing the worker to be guided to the storage location. Note that the identifier above the head may be held by a picking support device and extended therefrom, or may be attached on a helmet, eyeglasses, a band for hair or the like prepared separately, by a method using double-faced adhesive tape and the like. Alternatively, without use of an identifier, a physical feature such as a shape of the head or a state of head hair of a worker, or the like, not characterized by an identifier, may be photographed to be identified.

Additionally, an optical feature such as an identifier is provided on a worker as described above, but an identifier provided in a trolley, a cart, a forklift, a bag and the like that house a picked article and move with the worker, or an optical feature such as a shape of those instruments may be photographed to be recognized.

Also, the camera on the ceiling may be provided by one if a location where a picking work is conducted can be entirely open, and depending on a width or a layout, a plurality of cameras may be provided. The installation location, but not limited to the ceiling, may be on a wall surface or a floor surface, and an identifier such as a marker may be provided in the breast region, the back or the leg of a worker, instead of above the head. The face of a worker, without use of a marker, may be recognized. Photographed information may be directly sent wireless or wired to an information processing unit of each worker, or sent to a management terminal described below.

As the guidance method, the method that an optical feature is recognized by using the camera of a worker, the guidance method that uses radio waves, the inertial navigation that uses a combination of an accelerometer and a gyro and the method that an optical feature of a worker is recognized by using an external camera, as described above, may be used alone, alternatively any combination of two or more methods thereof may be used. This allows accuracy improvement and a decrease in cost to be expected.

Here, if information about a layout of a housing rack and the like in a warehouse is input in advance, then because a present position of a worker and a storage location of an article to be picked are grasped, the shortest pathway to a storage location of an article can be calculated and displayed on the display of the worker, thus exerting a great effect on improving work efficiency.

Furthermore, because a present position of a worker is grasped, if a mean for grasping a present position in a moving system such as a forklift, a truck and the like moving in a warehouse is also provided, then a state how workers approach each other, or how a worker approaches the moving system can be detected, and when approaching each other abnormally too close, a warning can be issued to the display and the audio response device of the worker. This allows a worker to work safely and therefore an efficient picking work to be realized.

Also, if a gyro sensor is built in the picking work support device, then an inclination of the camera and the HMD can be additionally grasped, and a shift of a position to be displayed in an image can be adjusted. Furthermore, the gyro sensor can continue to track an identifier alone or in combination with other sensor if the identifier is out of a field of the view.

Second Embodiment

Now, a picking work support device 101 according to a second embodiment of the invention will be described below with reference to the drawings. Note that items will be schematically described below to the extent of a necessary description to achieve an object of the invention and mainly described to the extent necessary to illustrate the part corresponding to the invention, and the part about which description will be omitted is of a known art. Also, the part common to the previous embodiment will not be described.

Figure 5:
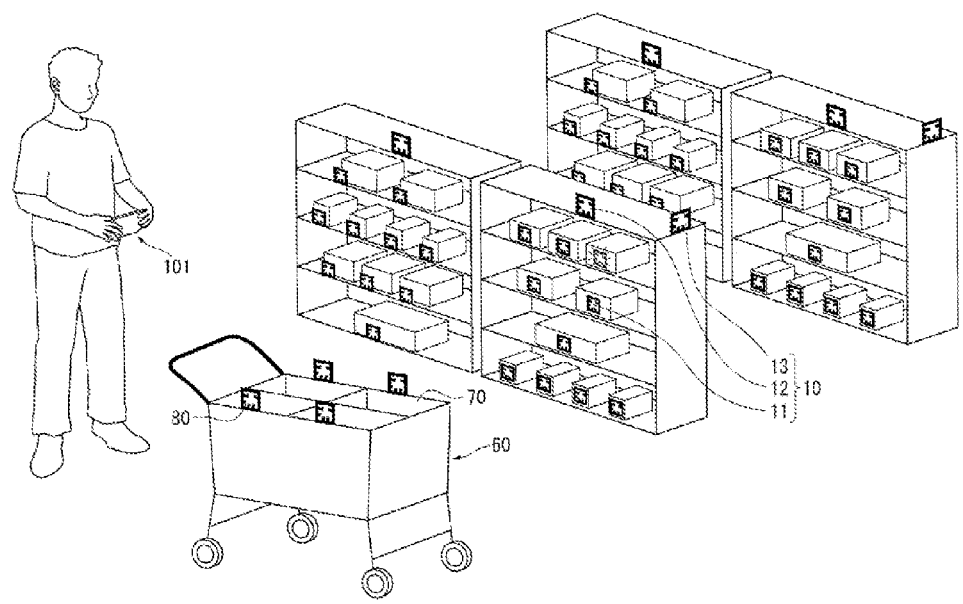
FIG. 5 is a schematic illustration of a picking work support system including a picking work support device according to a second embodiment of the invention.
Figure 6:
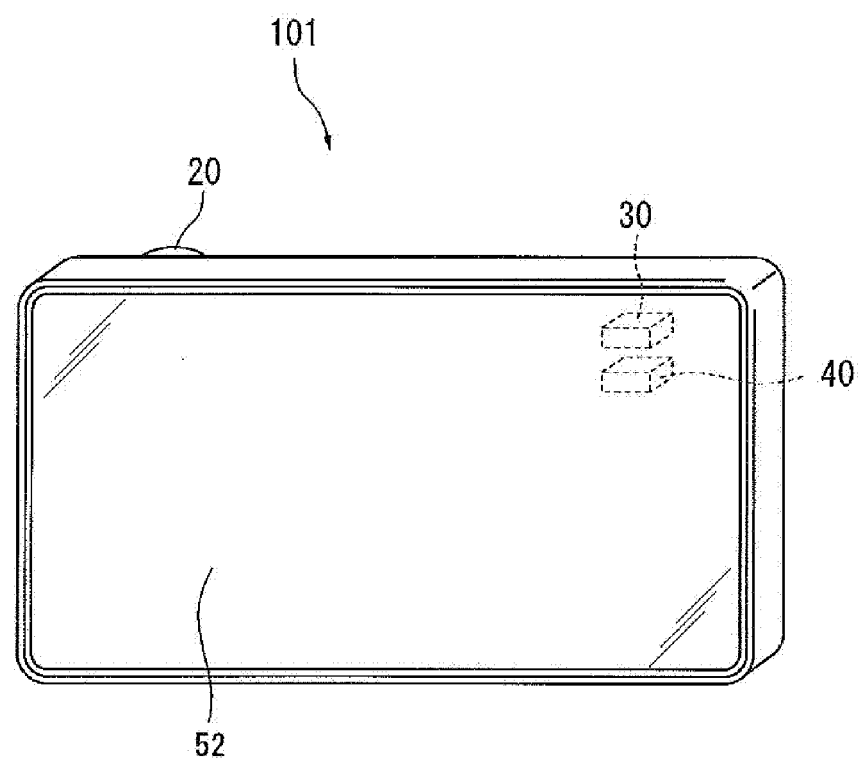
FIG. 6 is a general configuration view of the picking work support device according to the second embodiment of the invention.

FIG. 5 is a schematic illustration of a picking work support system including the picking work support device 101 according to the second embodiment of the invention, and FIG. 6 is a general configuration view of the picking work support device 101 according to the second embodiment of the invention.

Similarly to the first embodiment, to operate the picking work support device 101, there is provided an identifier 10 including a housing frontage identifier 11, a rack identifier 12 and an aisle identifier 13 attached on a housing frontage that houses an article, a rack including a plurality of the housing frontages and an aisle having a line of a plurality of the racks, respectively.

The picking work support device 101 includes an imaging unit such as a camera 20, a memory unit 30, an information processing unit 40 and a display 52, and is configured so that a worker who conducts a picking work can carry it.

Here, the camera 20 has a function for photographing a storage location of an article and the like. The camera 20 is preferably a digital camera because of image processing, but not limited to this. Also, it preferably can take moving pictures, but may take a still image.

The memory unit 30 has a function for storing picking work order information associated with information on the identifier 10. The memory unit 30 stores, as a series of information, various types of information, for example, about a work order number, a number of a worker who carries out the relevant work, and a housing frontage number, a housed article name and a numerical quantity of the picked articles related to an article to be picked by the relevant work order, and an identifier identification number corresponding to the housing frontage number.

The information processing unit 40 detects information on the identifier 10 from information on an image photographed by the camera 20, processes, based on the detected information and picking work order information in the memory unit 30, information on the identifier image to support a picking work and prepares information to support a picking work.

The display 52 displays image information photographed by the camera. It can display, together with it, image information, text information or the like from the information processing unit 40 or the like.

Here, the camera 20, the memory unit 30, the information processing unit 40 and the display 52 are electrically interconnected to each other. Also, to power them, a power supply such as a battery not show is incorporated therein or connected thereto. Furthermore, if needed, they are also connected to a communicating device not shown, to exchange information.

Note that the memory unit 30 may be eliminated if a picking work order is configured to be received from a system such as a remote, warehouse management system not shown via the communicating device for each picking work.

Next, working and operation of the invention configured in a manner described above will be described in detail.

A worker who engages in an article picking work, similarly to the first embodiment, receives worker personal authentication.

Figure 7:
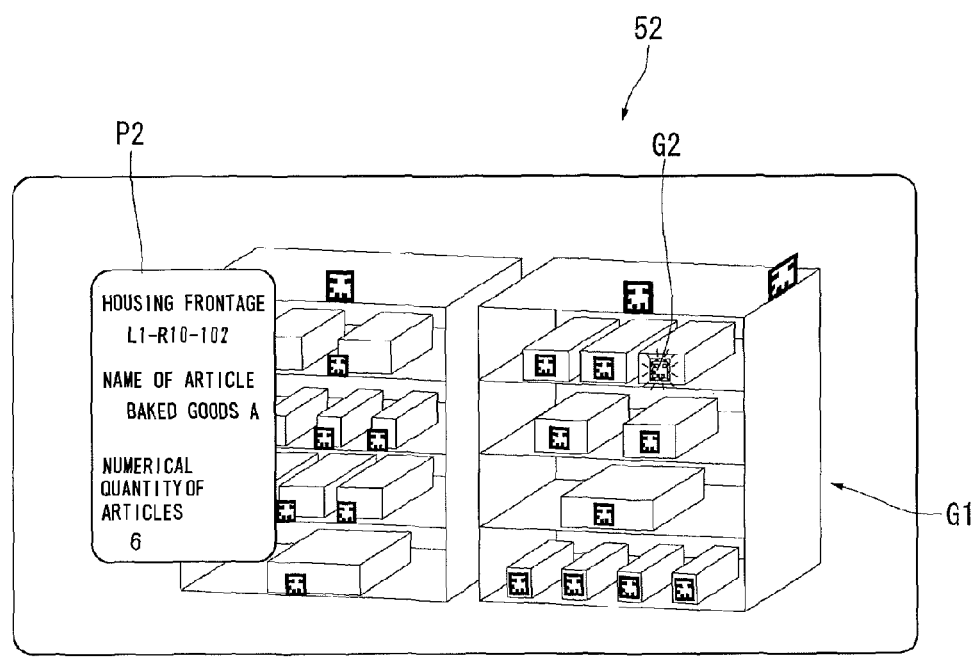
FIG. 7 is an illustration showing how the picking work support device according to the second embodiment of the invention is displayed.
Figure 8:
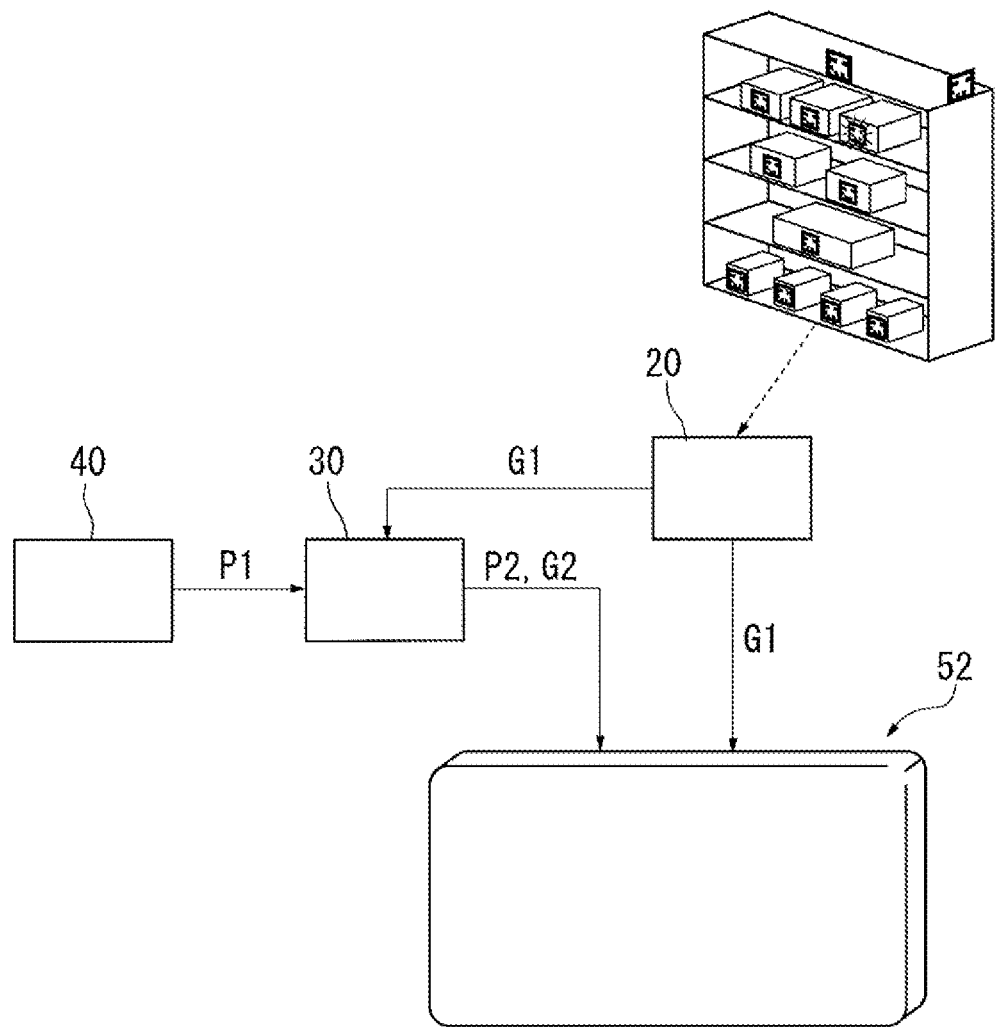
FIG. 8 is an illustration showing a flow of image information in the picking work support device according to the second embodiment of the invention.

FIG. 7 is an illustration showing a viewing surface in the display 52 of the picking work support device 101 according to the second embodiment of the invention, and FIG. 8 is an illustration showing a flow of image information in the picking work support device 101 according to the second embodiment of the invention.

The worker, subsequently, enters a location where an article is housed, and directs the camera 20 of the picking work support device 101 toward a storage location of an article. Then, an image F is photographed and image information G1 is obtained. The image information G1 includes some of the aisle identifiers 13. Here, the information processing unit 40 identifies an aisle where an article to be picked first is housed, based on the picking order information P1 stored in the memory unit 30 and information on the aisle identifiers 13 included in the image information G1, and processes the image information G2 on the identified aisle identifier 13, for example, to redly color a frame portion of the aisle identifier 13.

In particular, the image information G1 on the image of the rack that houses an article photographed by the camera is displayed in the part (for example, right half) of the viewing surface of the display 52. In the viewing surface of the display 52 on the left side, for example, picking work support information P2, such as a housing frontage number, an article name, a numerical quantity of articles to be picked, is displayed. The worker can see the image information G1 about the rack that houses an article and also the picking work support information P2. Here, the identified aisle identifier is displayed as the image information G2 in which the frame portion is redly colored, therefore the worker can correctly go to the aisle. Note that the colored image information G2 may be displayed superimposed on the image information G1, or may be displayed without being superimposed by directly processing the relevant portion of the image information G1. Also, a configuration of the viewing surface is not limited to this, and there may be various methods such as a method that all viewing surface is occupied by the image of a rack that houses an article photographed by the camera and the picking work support information is displayed superimposed on the viewing surface.

Note that the picking work support information P2, in addition to these, may include any information that helps to the picking such as information about a lot number, a pick unit number, a caution against similar goods, a direction for distributive processing, a method for identifying the top and the bottom of an article and a still image of an article.

Here, the processing of the identifier image information and the displaying of the picking order information in addition to or in substitution for the identifier image information are similar to the first embodiment and description thereof will be omitted.

The situation that the worker continues to approach the aisle, the rack and the housing frontage specified and the method by which the picking work is conducted are also similar to the first embodiment and description thereof will be omitted.

The method by which the worker, after completing the specified picking work, is given a next picking work order is also similar to the first embodiment and description thereof will be omitted.

In such a manner, the worker is given the next picking work order and continues the picking work according to it.

Once the worker completes a series of the picking work, the worker, after delivering the article already picked to a post-process with a predetermined method, returns to the preparation area and brings back the picking work support device 101 having the camera 20, the memory unit 30, the information processing unit 40 and the display 52. At the time, personal authentication after work completion may be executed in a method similar to that at the starting.

Note that the display in this embodiment may be a dedicated device, or a general-purpose device such as a PC, a mobile phone, a tablet-type device. In such a situation, there may be a device having a camera therein, which may be easily put to practical use.

Also, the display in this embodiment may be a head-mounted display (HMD). In such a situation, an identifier is not displayed superimposed on an actual, visual scenery as is in the first embodiment, but also, an identifier in an image photographed by the camera, similarly to other displaying way, may be processed and displayed. By doing so, a mechanism, such as a see-through mechanism for superimposing the identifier on a visual scenery, becomes unnecessary, resulting in a simple device.

Figure 9:
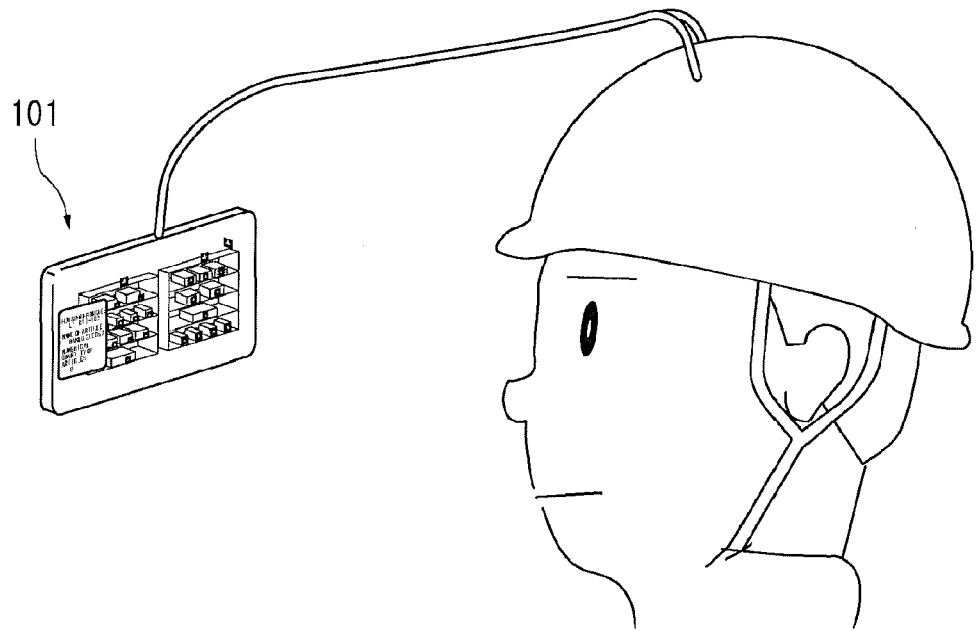
FIG. 9 is another, general configuration view of the picking work support device according to the second embodiment of the invention.

Also, as shown in FIG. 9, a support component from the crown of a helmet may be extended to in front of the eyes, and on the support component, a small display 101 such as a smartphone, a tablet may be installed. By doing so, both hands become free, allowing improvement of work efficiency to be expected. Note that the support component, but not limited to from the crown of the helmet, may be extended from the forehead, the back of the head, the temporal and the like. Also, other than from the helmet, the support component may be extended from any object that is worn on the head such as a hat, a band for hair.

Note that a picking support method in that it is not necessary to guide a worker and various methods for guidance without use of an identifier are similar to the first embodiment and description thereof will be omitted.

In any embodiment of the invention, the information processing unit 40 is built in the picking work support device as described above, but not limited to this. That is, all or a part of the information processing unit 40 may be provided remotely to process information via a communicating means. This is realizable, for example, by using a means such as the Internet, cloud computing and an ASP (application service provider).

Also, in any embodiment of the invention, if needed, an administrator may issue, by using an audio response device, picking order information in combination with an image or as a substitute of the image to a worker. In such a situation, in a very noisy work environment, a bone unit may be added to ensure communications between a worker and an administrator.

Furthermore, in any embodiment of the invention, the numerical quantity of cameras is one in the description with reference to the drawing, but a plurality of cameras may be adopted. Particularly by providing two cameras, various effects may be expected: that is, a stereo image may be display; a distance to a target object may be measured; and accurate and precise workability may be improved because of a stereo view due to a plurality of viewing points.

Figure 15:
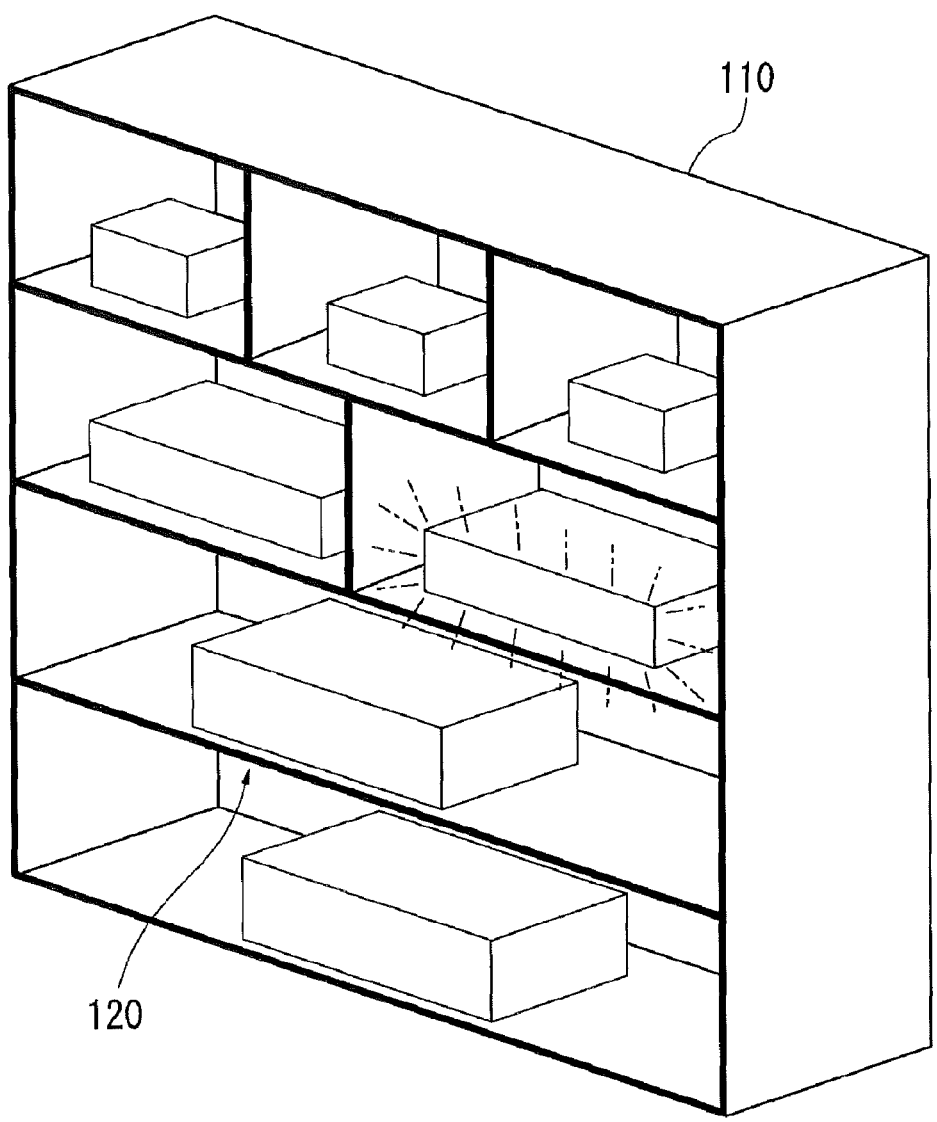
FIG. 15 is an illustration showing one example of an optical feature for the picking support device of the invention.
Figure 16:
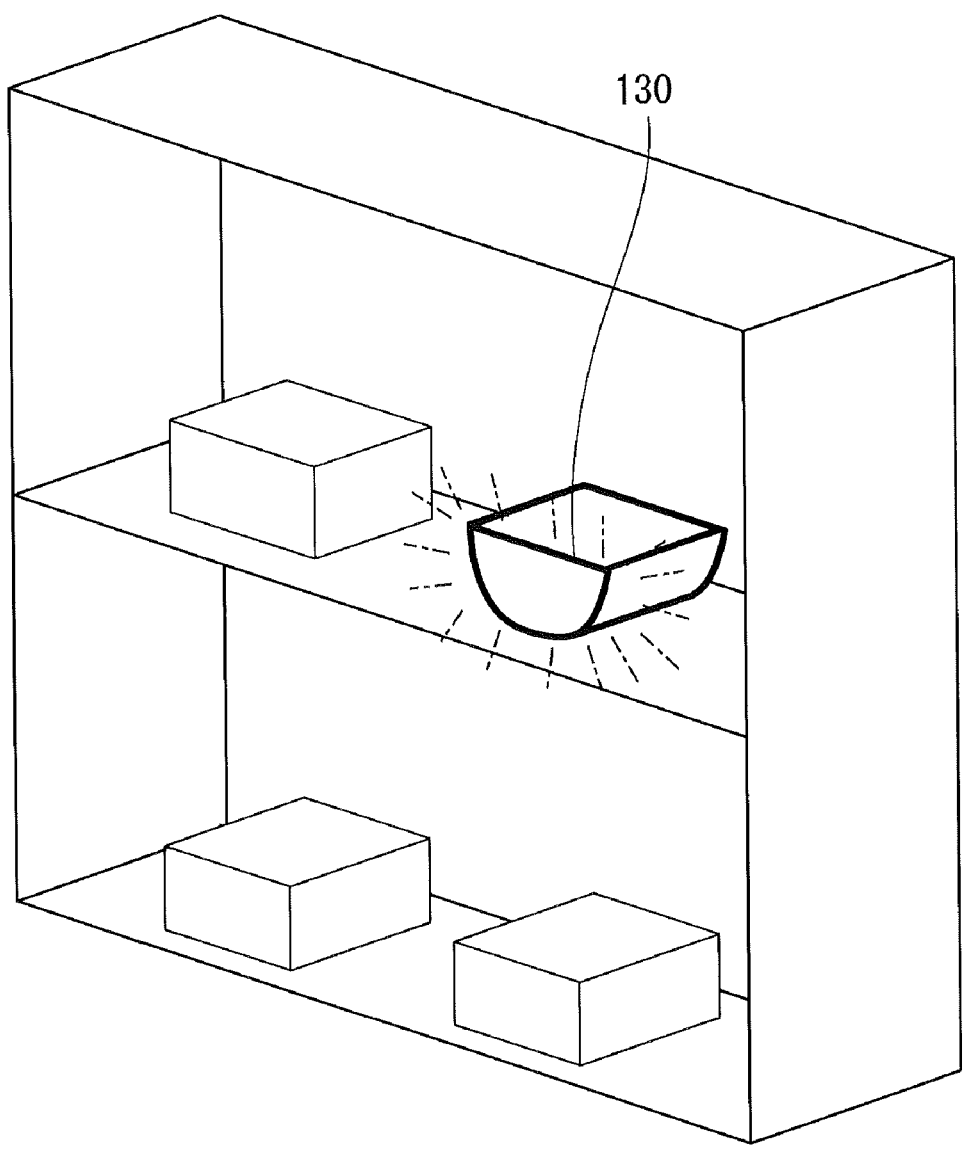
FIG. 16 is an illustration showing one example of the optical feature for the picking support device of the invention.
Figure 17:
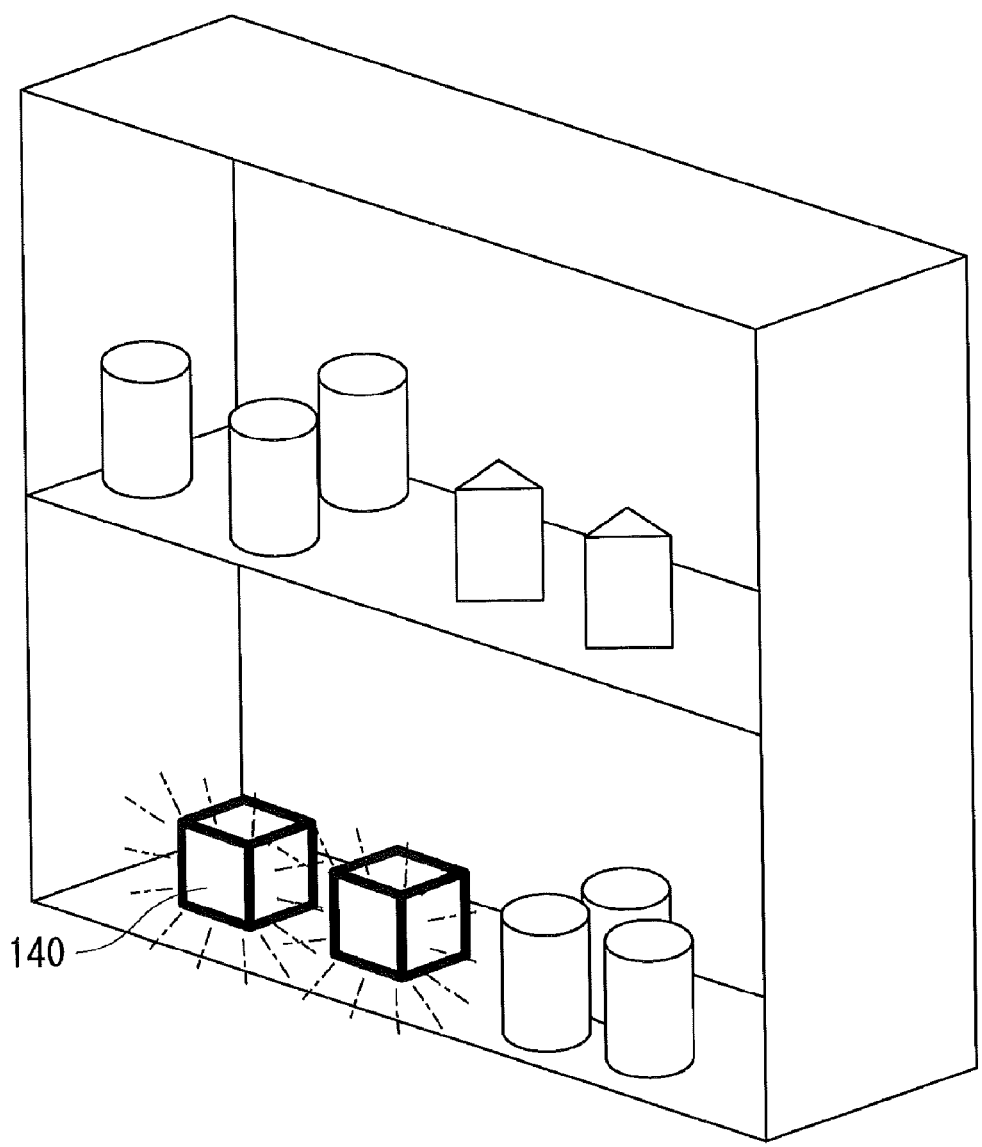
FIG. 17 is an illustration showing one example of the optical feature for the picking support device of the invention.

Also, in any embodiment of the invention, as an optical feature, an identifier, particularly an AR marker is used as described above, but an identifier, other than this, may be used. Furthermore, without use of an identifier, for example, a shape and a color of a partition 120 of a housing rack 110 or the housing rack 110 itself as shown in FIG. 15, a shape and a design on the surface of a housing case 130 as shown in FIG. 16, or a shape and a design on the surface of an article 140 itself as shown in FIG. 17 may be automatically read as an optical feature, and any combinations thereof may be used (for example, an identifier may be used on the way and a shape of an article may be used in the final stage).

Furthermore, in any embodiment of the invention, if an installation area of an identifier is wide so that an identifier which is to instruct a work order may be out of a field of the view of a camera, then information about a positional relation between identifiers is stored in advance, an identifier in the field of the view is recognized, and from there, a distance and a direction to an identifier which is to instruct a work order is calculated, and information about them may be displayed in a viewing surface by using an arrow and numeric characters indicating the distance. Such a method may be used for applications in that a next picking location, in addition to a present picking order, is displayed beforehand, and when a present work is completed, a next picking location is displayed for guidance, and the method has an effect on a quick work.

Also, in any embodiment of the invention, information about work and displaying may be input by means of a gesture using hands and fingers of a worker in a field of the view of a camera. For example, the gesture may be used to report work completion, request an additional order during work and scale a viewing area. Here, for recognition of the hand gesture, the Pinch method that is put to practical use in a smartphone and a method described in Japanese Patent Laid-Open No. 10-214346 are known and these may be applied.

Furthermore, in any embodiment of the invention, in this device, a work history of a worker may be collected. The work history includes, in particular, information about work efficiency such as a pathway to a storage location of an article and a time required to arrive there, and a time required to pick an article. The result thereof may be used to improve work efficiency of the picking work. A work time and a work pathway resulting from an actual picking work are recorded, so that a level of proficiency and a problem with work can be grasped and it is expected that work efficiency is quickly improved. Also, the work history may be also used as a behavior analysis tool of a worker. A worker may be trained based on a training, picking order, not by an actual work.

Also, in any embodiment of the invention, not only the work history of a worker collected, but a work indicator, that is, information about work may be displayed. A worker may be made to recognized how work progresses by showing, for example, a time required to pick an article, a pathway to a storage location of an article and a time required to arrive there, a difference between a planned, required time and an actual, required time, a target time to completion, a prospective time to completion and a difference between them, to help to improve efficiency.

Furthermore, in any embodiment of the invention, if a function for grasping position information from GPS and the like is provided, then by using the function and an identifier, lighting and air conditioning can be also controlled in a warehouse that houses an article. That is, according to a work order, a specific warehouse is instructed, and by the function for grasping position information, it is shown that a worker approaches there, then lighting and air conditioning may start operation.

Also, in any embodiment of the invention, if there is a device such as a head-mounted display having a portion that is worn in close contact with or close to the body, then on the portion, a clinical thermometer may be attached to manage a physical condition of a worker. For example, if work is conducted in a cold storage warehouse or in a high temperature environment, then an abrupt change in body temperature is accurately detected, so that an order such as an order to stop a picking work can be issued.

Furthermore, in any embodiment of the invention, a vibrator may be added to the picking work support device of the invention. By doing so, for example, in such a situation where an article is wrongly taken out from a different housing frontage, stimulation of vibration can alert a worker.

Also, any embodiment of the invention has an aspect in that a picked article is housed in the transportation case 70 on the trolley 60 as described above, but not limited to this, the picked article may be housed in a transportation case moving on a conveyor. In such a situation, the transportation case may be also provided with an identifier to support a housing work.

Furthermore, in any embodiment of the invention, a management terminal having a display and a work ordering unit by means of characters, an image and a voice may be provided with being directly connected to or connected via a server and the like to the picking work support device. The management terminal may be connected wired or wireless to each picking support device and display information similar to information displayed on the display of the picking support device, and an administrator, while seeing that, can issue a necessary order and receive a report. This can improve work efficiency of a worker.

Also, in any embodiment of the invention, it has been described that an article is picked, but conversely, the invention can be used to support work in which an article or a case that holds an article is sorted and carried to a predetermined location where it is to be housed, and an insufficient article is supplied to a predetermined location where it is to be housed, and also the invention can be used to support guidance to a location where an article or the like is to be housed.

Here, the guidance to a location where an article or the like is to be housed, similarly to the situation of the picking, may be conducted based on an optical feature, or may use a different guidance method from this. For example, the guidance method may be a guidance method that uses radio waves such as GPS, Wi-Fi, a wireless LAN and a mobile base station; a guidance method like inertial navigation that uses a combination of an accelerometer and a gyro carried by a worker; or any combinations of methods thereof; or any method that can guide a worker to a location where an article is to be housed.

Additionally, there may be the situation that it is not necessary to guide a worker, like the situation that a case to be sorted is shown in front of the worker, and in such a situation, a predetermined location where an article is to be housed may be clearly specified in the case.

Also, in any embodiment of the invention, when an abnormal state (earthquake, typhoon, fire and the like) occurs during a picking work, the invention may be applied as an escape tool. That is, according to information about a prepared escape route and following an identifier, a quick guidance to a safe location can be performed.

Furthermore, any embodiment of the invention can be used to maintain a storage location of an article such as a warehouse and an identifier itself. That is, if an identifier cannot be detected, then it may be thought that the identifier is missing and also a rack is damaged.

Also, in any embodiment of the invention, base material of an identifier is paper as described above, but not limited to this. For example, if the base material is laminated wood, plastic or metal, then it has an operating life longer than the paper. Furthermore, if electronic paper is used, then displayed contents can be electrically rewritten and it is reusable, thus less resources consumed. If an inorganic EL display is used, then it is not expensive and reusable. Also, an organic EL display or a lighting board may be used. Furthermore, if recursive, reflective material is used, then it is useful for work in a dark place. Also, if an identifier that is read by using visible light is not used, but an identifier that responds to infrared light, ultraviolet light and the like is used, then there is an advantage that detection accuracy can be enhanced, and the identifier can be hidden.

REFERENCE SIGNS LIST

10 identifier
11 housing frontage identifier
12 rack identifier
13 aisle identifier
20 camera
30 memory unit
40 information processing unit
50 head-mounted display
51 half mirror
52 transportable display
60 trolley 70 transportation case
80 transportation case identifier
90 quality inspection unit
100 picking work support device
101 picking work support device

The invention claimed is:

1. An article picking or sorting work support device, comprising:
   A) an imaging unit that obtains image information including automatically-readable, optical feature information associated with an article or a storage location of an article or a location where an article is to be sorted;
   B) an information processing unit that detects said optical feature information from the image information obtained by said imaging unit and processes image information about said optical feature information; and
   C) a display that displays information such as said image information and text information, wherein
   said information processing unit processes, based on said detected, optical feature information and predetermined, picking or sorting work order information, image information about specific, optical feature information and displays said processed image information from an aisle to a rack or further to housing frontage or image information of the aisle to the rack or further to the housing frontage themselves, on said display so that the displayed said processed image information or said image information of the aisle to the rack or further to the housing frontage themselves are emphasized superimposed on said image information obtained by said imaging unit or superimposed on actual visual scenery.

2. The article picking or sorting work support device according to claim 1, further comprising:
   D) a guidance unit that guides a worker to a storage location of an article, wherein
   after said guidance unit guides the worker to said storage location of an article, said information processing unit processes, based on said detected, optical feature information and the predetermined picking or sorting work order information, image information about said specific, optical feature information and
   said processed image information is displayed on said display at a location related to said specific, optical feature information.

3. The article picking or sorting work support device according to claim 2, wherein
   said guidance unit uses any one method of a method that uses automatically-readable, optical feature information similar to said automatically-readable, optical feature information associated with said article or said storage location of an article; a guidance method that uses radio waves; inertial navigation that uses a combination of an accelerometer and a gyro; and a method that recognizes, by using an external camera, an optical feature attached on a worker or an instrument moving with the worker; or any combination of two or more methods thereof.

4. The article picking or sorting work support device according to claim 1, further comprising:
   E) a memory unit that stores picking or sorting work order information associated with optical feature information, further wherein
   said information processing unit processes, based on said detected, optical feature information and the picking or sorting work order information in said memory unit, image information about said specific, optical feature information, and
   said processed image information is displayed on said display at a location related to said specific, optical feature information.

5. The article picking or sorting work support device according to claim 1, further comprising:
   F) an article quality inspection unit that inspects quality of an article to be picked or sorted, further wherein
   if said article is not suitable for being picked or sorted, a predetermined, processing method is issued.

6. The article picking or sorting work support device according to claim 1, wherein
   said information processing unit processes image information about said specific, optical feature information,
   said processed image information is displayed on said display at a location related to said specific, optical feature information, and
   also picking or sorting work support information prepared by said information processing unit is displayed on said display.

7. The article picking or sorting work support device according to claim 1, wherein
   said display is a head-mounted display that can display both of actual, visual scenery information and prepared information, and
   image information about said specific, optical feature information processed by said information processing unit is displayed on said display with the image information being associated with actual, visual scenery information at a location related to said specific, optical feature information.

8. The article picking or sorting work support device according to claim 1, wherein
   said display is a transportable display, and
   image information about said processed, optical feature information is displayed on said display with the image information being associated with image information photographed by said imaging unit at a location related to said specific, optical feature information.

9. The article picking or sorting work support device according to claim 1, wherein
   said automatically-readable, optical feature information associated with an article or a storage location of an article is an identifier.

10. The article picking or sorting work support device according to claim 9, wherein
    base material of said identifier is printable base material.

11. The article picking or sorting work support device according to claim 9, wherein
    base material of said identifier is base material in which information is rewritable.

12. The article picking or sorting work support device according to claim 9, wherein
    a present position of a worker is grasped from image information on said identifier.

13. The article picking or sorting work support device according to claim 9, wherein
    said work order information or work support information is displayed superimposed on said identifier.

14. The article picking or sorting work support device according to claim 1, wherein
    for a picked article, or an article to be sorted, information that is attached on said article to identify said article is photographed by said imaging unit, and
    whether said article agrees with the article specified by said picking or sorting work order or not is recognized.

15. The article picking or sorting work support device according to claim 1, wherein
in a field of the view of said imaging unit, information about work and displaying is input by means of a gesture using hands and fingers of a worker.

16. The article picking or sorting work support device according to claim 1, further comprising:
an audio response device including an audio input unit and/or an audio output unit.

17. The article picking or sorting work support device according to claim 1, wherein
said information processing unit is provided remotely.

18. The article picking or sorting work support device according to claim 1, wherein
a work history of a worker can be collected.

19. The article picking or sorting work support device according to claim 1, wherein
a work indicator is displayed on said display.

20. The article picking or sorting work support device according to claim 1, wherein
if said articles to be picked or sorted, are insufficient, said information processing unit issues an order for dealing with the trouble to a worker, according to a predetermined rule.

21. The article picking or sorting work support device according to claim 1, wherein
based on the situation that said optical feature cannot be detected, a failure of said optical feature itself or a structural object where said optical feature is provide is detected.

22. The article picking or sorting work support device according to claim 1, further comprising:
a management terminal having a display and a work ordering unit.

23. An article picking or sorting work support system, comprising:
A) automatically-readable, optical feature information associated with an article or a storage location of an article or a location where an article is to be sorted, and
B) a picking or sorting work support device including: an imaging unit that obtains image information about an article or a storage location of an article; an information processing unit that detects said optical feature information from the image information obtained by said imaging unit and processes image information about said optical feature information; and a display that displays information such as image information and text information, wherein
said information processing unit of said picking or sorting work support device processes, based on said detected, optical feature information and predetermined, picking or sorting work order information, image information about specific, optical feature information and displays said processed image information from an aisle to a rack or further to housing frontage or image information of the aisle to the rack or further to the housing frontage themselves, on said display so that the displayed said processed image information or said image information of the aisle to the rack or further to the housing frontage themselves are emphasized superimposed on said image information obtained by said imaging unit or superimposed on actual visual scenery.

24. The article picking or sorting work support system according to claim 23, further comprising:
a guidance unit that guides a worker to a storage location of an article, wherein
after the guidance unit of said picking work support device guides the worker to the storage location of the article, said information processing unit processes, based on said detected, optical feature information and the predetermined picking or sorting work order information, image information about said specific, optical feature information and
said processed image information is displayed on said display at a location related to said specific, optical feature information.

25. The article picking or sorting work support system according to claim 24, wherein
said guidance unit uses any one method of a method that uses automatically-readable, optical feature information similar to said automatically-readable, optical feature information associated with said article or said storage location of the article; a guidance method that uses radio waves; inertial navigation that uses a combination of an accelerometer and a gyro; and a method that recognizes, by using an external camera, an optical feature attached on a worker or an instrument moving with the worker; or any combination of two or more methods thereof.

26. The article picking or sorting work support system according to claim 23, further comprising:
a memory unit that stores picking or sorting work order information associated with said optical feature information, wherein
said information processing unit processes, based on said detected, optical feature information and said picking or sorting work order information in said memory unit, image information about said specific, optical feature information and
said processed image information is displayed on said display at a location related said specific, optical feature information.

27. The article picking or sorting work support system according to claim 23, further comprising:
an article quality inspection unit that inspects quality of an article to be picked or sorted, wherein
if said article is not suitable for being picked or sorted, a predetermined processing method is issued.

28. The article picking or sorting work support system according to claim 23, wherein
said information processing unit processes image information about said specific, optical feature information,
said processed image information is displayed on said display at a location related to said specific, optical feature information, and
also picking or sorting work support information prepared by said information processing unit is displayed on said display.

29. The article picking or sorting work support system according to claim 23, wherein
said display is a head-mounted display that can display both of actual, visual scenery information and prepared information, and
image information about said specific, optical feature information processed by said information processing unit is displayed on said display with the image information being associated with actual, visual scenery information at a location related to said specific, optical feature information.

30. The article picking or sorting work support system according to claim 23, wherein
said display is a transportable display, and
image information about said processed, optical feature information is displayed on said display with the image information being associated with image information photographed by said imaging unit at a location related to said specific, optical feature information.

31. The article picking or sorting work support system according to claim 23, wherein
said automatically-readable, optical feature information associated with an article or a storage location of an article is an identifier.

32. The article picking or sorting work support system according to claim 31, wherein
base material of said identifier is printable base material.

33. The article picking or sorting work support system according to claim 31, wherein
base material of said identifier is base material in which information is rewritable.

34. The article picking or sorting work support system according to claim 31, wherein
a present position of a worker is grasped from image information on said identifier.

35. The article picking or sorting work support system according to claim 31, wherein
said work order information or work support information is displayed superimposed on said identifier.

36. The article picking or sorting work support system according to claim 23, wherein
for a picked article, or an article to be sorted, information attached on said article to identify said article is photographed by said imaging unit, and
whether said article agrees with the article specified by said picking or sorting work order or not is recognized.

37. The article picking or sorting work support system according to claim 23, wherein
in a field of the view of said imaging unit, information about work and displaying is input by means of a gesture using hands and fingers of a worker.

38. The article picking or sorting work support system according to claim 23, further comprising:
an audio response device including an audio input unit and/or an audio output unit.

39. The article picking or sorting work support system according to claim 23, wherein
said information processing unit is provided remotely.

40. The article picking or sorting work support system according to claim 23, wherein
a work history of a worker can be collected.

41. The article picking or sorting work support system according to claim 23, wherein
a work indicator is displayed on said display.

42. The article picking or sorting work support system according to claim 23, wherein
if said articles to be picked or sorted, are insufficient, said information processing unit issues an order for dealing with the trouble to a worker, according to a predetermined rule.

43. The article picking or sorting work support system according to claim 23, wherein
based on the situation that said optical feature cannot be detected, a failure of said optical feature itself or a structural object where said optical feature is provide is detected.

44. The article picking or sorting work support system according to claim 23, further comprising:
a management terminal having a display and a work ordering unit.

* * * * *